United States Patent [19]
Levesque

[11] 3,725,762
[45] Apr. 3, 1973

[54] HYBRID PROCESS CONTROLLER OPERABLE IN THE AUTOMATIC AND MANUAL

[75] Inventor: Peter S. Levesque, Jenkintown, Pa.

[73] Assignee: Fischer & Porter Co., Warminster, Pa.

[22] Filed: Aug. 5, 1971

[21] Appl. No.: 169,375

[52] U.S. Cl.................................318/591, 318/609
[51] Int. Cl................................................G05b 7/00
[58] Field of Search..........................318/591, 609

[56] References Cited

UNITED STATES PATENTS 3,363,157 1/1968 Rouvalis...........................318/591 X
3,655,992 4/1972 Ohno et al........................318/591 X Primary Examiner—T. E. Lynch
Attorney—Michael Ebert

[57] ABSTRACT

An electronic controller forming a part of a process control system in which a signal representative of a process variable is compared with a set point signal to produce an output signal to operate a final control element. The controller includes a hybrid digital-analog configuration which permits bumpless transfer between automatic and manual modes, in an arrangement which is drift-free in the manual mode and does not require a long resistor-capacitor time constant.

8 Claims, 1 Drawing Figure

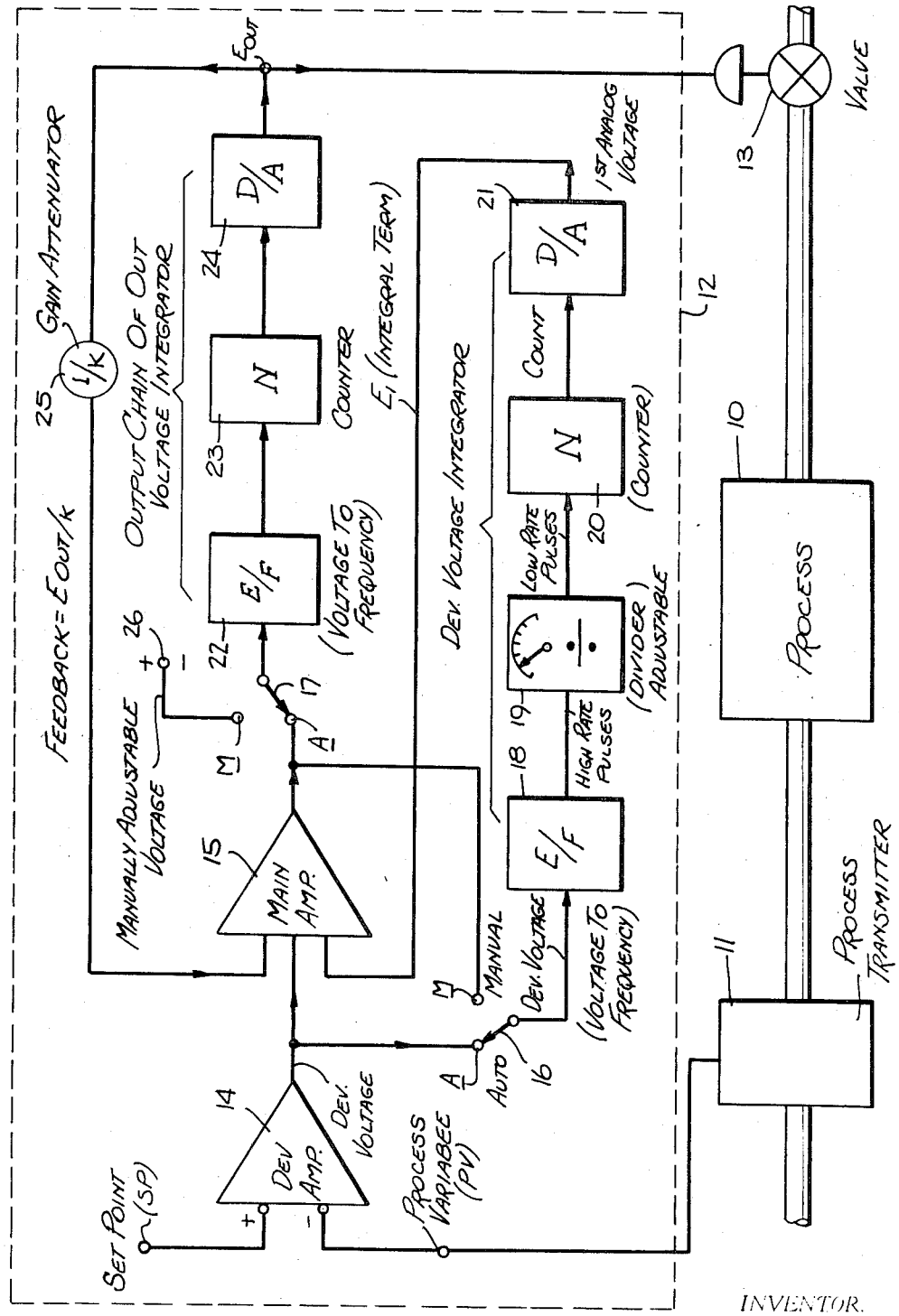

HYBRID PROCESS CONTROLLER OPERABLE IN THE AUTOMATIC AND MANUAL

BACKGROUND OF THE INVENTION

This invention relates generally to electronic controllers forming part of a process control system, and more particularly a controller in which transfer from automatic to manual operation is effected in a "bumpless" manner.

An electronic controller is a component in a process control loop which is subject to disturbances, the controller acting in conjunction with other devices to maintain a process variable at a desired value. To accomplish this purpose, the controller receives, in terms of electrical signals, both the set point value and the process variable, the controller functioning to operate a final control element which directly or indirectly governs the process variable.

The factor controlled may be flow rate, pressure, viscosity, liquid level, or any other process variable. Thus the input signal of the controller may be derived from a rate-of-flow meter whose reading is translated into a corresponding electrical value. The output of the controller may be impressed on a flow-regulating valve, which valve is opened or closed or is caused to assume an intermediate position as determined by the controller. The specific nature of the process variable and the final control element is not the concern of the present invention, which is applicable to all forms thereof.

Electronic controllers are generally classified by the type of control action or modes of control they provide. In electronic controllers, the modes commonly used are proportional, proportional-plus-reset, proportional-plus-rate, and proportional-plus-reset-plus-rate. In the proportional mode, the process variable input signal is compared to the desired set point to produce a deviation signal which when applied to the controller causes a change in output signal proportional thereto. The degree of change in output signal for a given change in deviation signal depends on the proportional band, reset and rate times of the controller.

Electronic controllers ordinarily operate automatically to maintain a process condition at a desired level. But in some situations, it becomes necessary to transfer the controller from automatic to non-automatic or manual operation. Thus it may be desirable to control the process condition by means of a manually-adjustable signal or by a signal derived from a remote source, such as a computer.

Bumpless transfer may be effected procedurally by providing the transfer switch with a balance position in which certain readings can be taken and corresponding adjustments made to permit a transfer to be made without upsetting the process. However, this transfer procedure leaves much to be desired, for it not only entails time on the part of an operator, but also opens up the possibility of operator error and adverse consequences as a result of such error.

"Automatic bumpless transfer" is the accepted term for a transfer for automatic to manual without the need for an operator to balance the manual output to the existing automatic level. This may be accomplished with a servo-follower adapted to track the automatic controller output with the manual signal. In this arrangement, when transferring from manual to automatic, the manual output signal is fed into the operational amplifier of the controller through a capacitor which forces the automatic output to be equal to the manual output at the moment of transfer. If transfer is made at a point displaced from the set point, the system will shift the process toward the setpoint at the reset rate of the controller. This is sometimes referred to as slide-back action.

In U.S. Pat. No. 3,550,014, there is disclosed a bumpless transfer system for switching directly between automatic and non-automatic modes without upsetting the process, the system including a capacitor adapted to store a charge as a memory signal. The arrangement is such that when the controller operates in the automatic mode, the charge on the capacitor is maintained at a level corresponding to the output signal of the controller, but when the controller is switched over to manual operation, the charge stored in the capacitor is directed to the input of the controller. In this way, the output signal of the controller is effectively equal to that existing prior to switch-over. When in manual operation, the reset resistor-capacitor network then serves as a memory device to remember the actual status of the process condition relative to its set point and the relationship of that status to the actual manually adjusted output of the controller, so that when the controller is returned to automatic operation, no bump will be experienced at the instant of switchback.

SUMMARY OF THE INVENTION

The main object of this invention is to provide an electronic controller operable either in the manual or automatic mode, the controller being adapted to effect bumpless transfer between modes without requiring a long resistor-capacitor time constant to generate the reset term in the automatic mode or to create the holding memory in the manual mode.

More specifically, it is an object of this invention to provide a hybrid digital-analog controller adapted to control a process in the manual or automatic control mode with the optional possibility of computer control.

Among the advantages of the hybrid digital-analog configuration, in accordance with the invention, the following:

A. Transfer between control modes is invariably bumpless and no drift is experienced in the manual control mode;

B. The integration time constant in the automatic mode is not dependent on large RC time constants and is, therefore, unaffected by small leakage currents;

C. The integration time in the automatic mode may be set to infinity (Manual Reset);

D. The proportional term may be set to zero (Integral Only Control); and

E. The output can be directly governed by a digital computer.

F. The manual value is held in a digital register and is not subject to drift due to small leakage currents.

Briefly stated, in an electronic process controller, in accordance with the invention, a process variable signal is compared with a set point signal to produce a deviation voltage dependent on the difference therebetween. The deviation voltage is applied both to a summing amplifier and to a deviation voltage integrator. The deviation voltage integrator converts the deviation voltage into periodic pulses whose sense and rate are functions thereof, the pulses being totalized to produce a count which is converted to a first analog voltage. This analog voltage is the time integral of the deviation voltage.

The output voltage of the summing amplifier is applied to an output integrator which converts this voltage into periodic pulses whose sense and rate are functions thereof, these pulses being totalized to produce a count that is converted into a second analog signal. The second analog signal which is the time integral of the summing amplifier output, is fed back negatively through a gain attenuator to the input of the amplifier, to which input is also applied the first analog signal. The main amplifier, the output integrator and the gain attenuator form a stable, closed loop in which the summation of inputs to the main amplifier equals zero. (The deviation voltage and the first and second analog voltages). The output voltage yielded by the output integrator is applied to the final control element in the process to govern the operation thereof.

When switching the controller to manual operation, the deviation voltage is removed from the input of the deviation voltage integrator, which input is connected to the output of the summing amplifier, the output of this integrator remaining connected to the input of the amplifier. The output of the summing amplifier is removed from the input of the output integrator, which input is connected to a manually-adjustable voltage source for manual operation of the final control element. Thus in the manual mode, the deviation integrator and summing amplifier form a closed loop, such that the summation of inputs to the amplifier is equal to zero.

OUTLINE OF THE DRAWING

For a better understanding of the invention as well as other objects and further features thereof, reference is made to the following detailed description to be read in conjunction with the accompanying drawing whose single FIGURE is a block diagram of an electronic controller in accordance with the invention, operable in either the manual or automatic mode, the transfer between modes being bumpless.

DESCRIPTION OF THE INVENTION

Referring now to the drawing, there is shown a process 10 to be controlled, which is provided with a condition-sensing device in the form of a transmitter 11 that yields a signal, preferably in the form of a D-C output current corresponding to the value of the process condition (such as flow rate) being sensed. This condition may be any variable encountered in a process, and the nature of the sensing transducer, which may be any standard device, depends, of course, on the variable in question.

The output of process transmitter 11 is applied as the process variable signal (PV) to one input of an electronic controller generally designated by numeral 12, which compares the process variable with a set point signal (SP) and produces an output signal for operating the final control element serving to govern the process variable. By way of example, the figure shows a valve 13 in the process line, the valve acting as the final control element to vary the flow in the line.

In controller 12, set point signal (SP) and process variable signal (PV) are applied to the input terminals of a deviation amplifier 14, whose output, referred to as the "deviation" voltage, is equal in magnitude and direction to the difference between PV and SP. The deviation voltage yielded by deviation amplifier 14 is fed to one input of a summing or main amplifier 15.

Controller 12 is adapted to function in both the automatic and manual mode, switch-over from automatic to manual and back being effected by switches 16 and 17, each having a movable contact adapted to engage either an auto operation control fixed contact A or manual operation control fixed contact M. In the drawing, the switches, which in practice may be ganged, are shown in their A positions for automatic control of the process.

AUTOMATIC MODE

In the automatic mode, the output of deviation amplifier 14 which is fed to main amplifier 15, is also applied to a voltage-to-frequency (E/F) converter 18. Converter 18 makes use of a voltage-responsive pulse generator whose repetition rate or frequency is proportional to the input voltage. Hence the pulse rate produced by converter 18 is proportional to the deviation voltage and varies as the process variable PV deviates from set point SP.

The pulse train emerging from converter 18 is fed to a binary divider 19 to produce output pulses at a relatively low rate. The division, effected by divider 19, determines the integration time constant $\tau$. The divider is adjustable, so that the integration time constant is also adjustable. Output pulses from the divider 19 are totalized by an integrating counter 20, and the digital count residing therein is transformed by a digital-to-analog (D/A) converter 21 into a corresponding analog signal.

Thus in the automatic mode, the analog voltage developed in the output $E_1$ of the deviation voltage integrator is the time integral of the deviation voltage produced in the output of deviation amplifier 14. The time integral term is fed to an input of main amplifier 15.

In the automatic mode, the output voltage of main amplifier 15 is applied through switch 17 to an output voltage integrator constituted by a voltage-to-frequency converter 22, an integrating counter 23 and a digital-to-analog converter 24 forming an integrator similar to the deviation voltage integrator. The output $E_{out}$ of this chain is fed back through a gain attenuator 25 (1/K) as a negative feedback signal to main amplifier 15. Output voltage $E_{out}$ is also applied to the actuator of valve 13 to govern the operation thereof.

The three inputs to main or summing amplifier 15, in the automatic mode are (a) the deviation voltage (DEV) from deviation amplifier 14, (b) the integral term $E_1$ from the deviation voltage integrator, and (c) the attenuated negative feedback voltage $E_{out}/K$. The condition for Summation Inputs = 0 is therefore defined by the following equations:

$$\text{Dev} + (1/\tau) \int \text{Dev}\, dt + (E_{out}/K) = 0$$

so, $$K[\text{Dev}+(1/\tau)\int \text{Dev}\, dt]=-E_{out}$$

This is the desired control equation. Main amplifier 15, output voltage integrator (22,23 and 24) and gain attenuator 25 form a stable, closed loop for which the summation of the input to the main amplifier equals zero, thus satisfying the control equation.

Though not shown, it is to be understood that the controller configuration may include derivative action, feed-forward, over-ride and various other conventional analog control techniques.

MANUAL MODE

When the controller is transferred from automatic to manual operation, switch 17 then breaks the connection between the output of main amplifier 15 and output voltage integrator (22,23 and 24). In the manual mode, the voltage applied to the input of the voltage-to-frequency converter 22 of the output voltage integrator is derived from a voltage source 26 which is adjustable to provide in the output of the integrator, an output voltage $E_{out}$ for controlling the final control element.

In the manual mode, the deviation voltage amplifier is disconnected from the deviation voltage integrator, the input of the deviation voltage integrator being connected by switch 16 to the output of main amplifier 15 so that the integrator is configured to track the output. The deviation voltage integrator and main amplifier 15 then form a closed loop such that the summation of inputs to amplifier 15 is zero. Then:

$$E_1+\text{Dev}+(E_{out/K})=0$$

Thus the $E_1$ term in the manual mode is set to satisfy the automatic mode equation to assure bumpless transfer from the manual to the automatic mode.

In the analog process controller arrangement disclosed herein, the proportional term is calculated and summed with the integral time by conventional analog techniques, and the integral term is calculated and stored using digital techniques. In the analog process controller, the output circuit of the automatic mode feedback includes a digital memory element.

While there has been shown and described a preferred embodiment of a hybrid process controller operable in the automatic and manual mode in accordance with the invention, it will be appreciated that many changes and modifications may be made therein without, however, departing from the essential spirit of the invention.

I claim:

1. An electronic controller for a process having a variable condition, the process being provided with a sensor responsive to said condition to produce a process variable signal and a final control element to govern the process, said controller being operable in either the manual or automatic mode and being transferable between modes without giving rise to a process bump, said controller comprising:
   A. means to produce a deviation voltage whose value depends on the difference between said process variable signal and a set point signal,
   B. a summing amplifier,
   C. a deviation voltage integrator and an output voltage integrator, each including means to convert an applied voltage into an analog voltage representing the time integral of the applied voltage,
   D. switching means in the automatic mode to apply said deviation voltage both as a positive first input to said summing amplifier and as an input to said deviation voltage integrator, and to apply the output voltage of said summing amplifier as an input to said output voltage integrator, the analog voltage developed by said deviation voltage integrator being fed as a positive second input to said summing amplifier, the analog voltage developed by said output voltage integrator being attenuated and applied as a negative third input to said summing amplifier, whereby said summing amplifier sums the first, second and third inputs applied thereto,
   E. switching means in the manual mode to apply said deviation voltage as an input to said summing amplifier, to connect said deviation voltage integrator between the input and output of said summing amplifier to form a closed feedback loop, and to connect a manual control voltage to the input of said output voltage integrator, and
   F. means in both the manual and automatic mode to apply the analog voltage developed by said output voltage integrator to said final control element to govern same.

2. An electronic controller as set forth in claim 1, wherein said deviation voltage integrator and said output voltage integrator each include means to convenrt said applied voltage to periodic pulses whose repetition rate is related to the applied voltage and to totalize the pulse to produce a count which is converted into a corresponding analog voltage.

3. A controller as set forth in claim 1, wherein said deviation voltage is produced by a deviation amplifier adapted to compare said process variable and set point signals.

4. A controller as set forth in claim 1, wherein the parameters of the arrangement in the automatic mode is such as to produce a summation of the first, second and third inputs to said amplifier which is equal to zero.

5. A controller as set forth in claim 1, wherein the parameters of the arrangement in the manual mode are such as to produce a summation of the inputs to the amplifier which is equal to zero.

6. An arrangement as set forth in claim 2, wherein said deviation voltage integrator is constituted by a voltage-to-frequency converter to produce said periodic pulses, a binary divider to divide down said pulses to produce counting pulses, an integrating totalizer to count said counting pulses, and a digital-to-analog converter to produce an analog voltage corresponding to said count.

7. An arrangement as set forth in claim 2, wherein said output voltage integrator is constituted by a voltage-to-frequency converter, a counter applied to the output of said converter and a digital-to-analog converter coupled to said counter.

8. An arrangement as set forth in claim 7, further including a gain attenuator interposed between the output of said output voltage integrator and the input of said amplifier.

* * * * *